United States Patent [19]
Nassimbene

[11] 3,805,175
[45] Apr. 16, 1974

[54] RETROSPECTIVE PULSE MODULATION DECODING METHOD AND APPARATUS

[75] Inventor: Ernie George Nassimbene, San Jose, Calif.

[73] Assignee: International Business Machines Corporation, Armonk, N.Y.

[22] Filed: Sept. 25, 1972

[21] Appl. No.: 292,006

Related U.S. Application Data

[62] Division of Ser. No. 183,839, Sept. 27, 1971, Pat. No. 3,763,353, which is a division of Ser. No. 31,959, April 27, 1970, Pat. No. 3,708,748.

[52] U.S. Cl. ................. 329/104, 178/88, 325/38 B, 325/321, 328/109, 329/107

[51] Int. Cl. ................. H03k 3/02

[58] Field of Search ............ 329/104, 107; 328/109, 328/110, 111, 112; 325/320–325, 38 B; 178/88

[56] References Cited

UNITED STATES PATENTS

| | | | |
|---|---|---|---|
| 3,601,710 | 8/1971 | Morra | 329/104 |
| 3,582,784 | 6/1971 | Gaunt | 329/104 X |
| 3,386,078 | 5/1968 | Varsos | 329/104 X |
| 3,548,327 | 12/1970 | Vermeulen | 329/104 X |
| 2,904,683 | 9/1959 | Meyer | 329/104 X |

*Primary Examiner*—Alfred L. Brody
*Attorney, Agent, or Firm*—George E. Roush

[57] ABSTRACT

Digital data in self-timing reference is free from error due to irregular data spacing because of variations in speed and/or direction of scan in manual or machine applications with a pulse modulation of retrospective nature. Initially reference data manifestations are established and thereafter digital data are established partly on the basis of preceding manifestations of the data. In a binary data translating system, for example, a pair of reference pulses are spaced apart by a given interval. A binary unit is thereafter manifested by a pulse following at the same or similar interval and a binary zero is manifested by a pulse following at a differing interval. Each manifestation of a binary number thereafter depends on the interval between preceding pulses. A principle advantage of retrospective pulse modulation lies in demodulation. Large variations in the spacing and relatively larger variations in the scanning speed are accommodated readily. Simple methods using circuit demodulating means are applied for measuring intervals between successive pulses and for comparing the measurements successively, indicating data of one nature or number by equal measurements and data of another by unequal measurements. Methods using basic analog circuitry are described; methods using digital circuitry are suggested.

14 Claims, 30 Drawing Figures

RETROSPECTIVE PULSE MODULATION DECODING METHOD AND APPARATUS

The instant U. S. patent application was divided from that U. S. patent application Ser. No. 183,839 filed on the 27th day of Sept. 1971, which in turn was divided from that U. S. patent application Ser. No. 31,959 filed on the 27th day of Apr. 1970 and thereafter issued on the 2nd day of Jan. 1973, as U. S. Pat. No. 3,708,748.

The invention relates to digital data handling systems, and it particularly pertains to methods of modulating and demodulating a signal pulse series, together with modem apparatus therefor, although, it is not limited thereto.

The art of digital data information handling has progressed for decades to a level at which there are available a number of excellent modulating and demodulating systems and appropriate apparatus for setting up and operating those systems. Each system as thus far developed has advantages and disadvantages. Digital data transmission and processing is especially well handled by a relatively large number of pulse modulation systems; each system has definite advantages for certain purposes and conversely frequently has disadvantages for other systems.

The most serious shortcomings in conventional apparatus stem from the necessity for timing and reference apparatus operating in conjunction with the modulating and demodulating (Modem) apparatus. Prior art suggestions for reducing the Modem and clocking apparatus in several digital information handling systems are reflected in the following U. S. Pat. Nos.:

2,530,081—11/1950—Ross
2,612,994—10/1952—Woodland et al
2,633,564—3/1953—Fleming, Jr.
3,020,526—2/1962—Ridler et al
3,106,706—10/1963—Kolanowski et al
3,142,806—7/1964—Fernandez
3,145,291—8/1964—Brainerd
3,166,712—1/1965—Graham
3,212,014—10/1965—Wiggins et al
3,292,489—12/1966—Johnson et al
3,409,760—11/1968—Homisch et al
3,413,447—11/1968—LaMera
3,417,234—12/1968—Sundblad
3,418,456—12/1968—Homisch et al
3,474,191—10/1969—Frohbach et al
3,474,234—10/1969—Rieger et al And in the technical literature:

E. G. Nassimbene, "Voicing Detector," March 1965, pp. 923–4, IBM Technical Disclosure Bulletin, Vol. 7, No. 10;

A. Desblache, "Coding Device for Delta Modulation," February 1968, pp. 1,424–5, IBM Technical Disclosure Bulletin, Vol. 10, No. 9; and G. A. Hellworth & G. D. Jones, "Push-Pull Feedback Delta Modulator," December 1968, pp. 877–8, IBM Technical Disclosure Bulletin, Vol. 11, No. 7.

The objects referred to indirectly hereinbefore and those that will appear as the specification progresses are attained in methods of modulating and demodulating a series of discrete manifestations spaced for representing data in accordance with previous spacing of manifestations for conveying information. In one embodiment according to the invention, binary data comprising naughts and units are represented in a series of pulses spaced in progression as the data is arranged. For example, a start pulse is generated and at a given time interval thereafter, an initial reference pulse is generated. One binary character, for example, the binary unit, or number 1, is thereafter manifested by a pulse spaced substantially at the same interval as between the initial and reference pulses. A binary naught, or 0, is then denoted by a further pulse following the last pulse by an interval different from the spacing between the preceding pulses. Preferably, the different spacing is of the order of 2:1; for example, a binary unit may be manifested by three pulses in series with equidistant spacing between the succeeding pulses and a binary naught would be manifested by three pulses appearing in series with a spacing between two of the pulses twice as great as that between one of the previous pulses and the succeeding pulse. The manifestation, or coding, of the binary data, after the start and reference pulses, is on a single pulse per character but the value or identity of that character is dependent on the manifestation of the previous value or character. Thus, a pulse denoting one binary character is established after two succeeding spacings substantially equal to each other and the other binary character is effected by a pulse occurring after two other pulses spaced by substantially different spacings but without regard to the order of the occurrence of the different spacings.

According to the invention, a basic modulator for retrospective pulse modulation comprises a generator forming pulses at substantially equal intervals and a modulator arranged to blank a single pulse at those intervals requisite for manifesting a character by a wider spacing between pulses in relationship to spacing between the two preceding pulses. Alternately, a pulse may be inserted intermediately of two succeeding pulses delivered by the generator.

Basically a demodulator for a retrospective pulse modulated signal comprises a pair of identical circuits for measuring the spacing between pulses, a switching arrangement enabling the measuring circuits alternately, and a comparing circuit for comparing the measurements on an equals-not equals basis. A bistable reciproconductive circuit, a pair of resistor-capacitor integrating circuits, and a differential amplifying circuit of conventional form may be arranged for this purpose. Presetting of the measuring circuits basically is accomplished by differentiating circuits effective at the beginning of each measuring time to discharge the capacitor and thereafter allow it to be charged in accordance with the spacing between pulses. Simple gating circuitry and a bistable reciproconductive circuit for pegging the spacing between the last succeeding pulses may be of conventional form for this basic modulator. Alternately a pulse counting arrangement may be used where the auxiliary circuitry is readily available.

An application of retrospective pulse modulation and the basic apparatus therefor is advantageous in a flexible system for searching magnetic tape at high speed in order to locate a portion or block of the tape to be reproduced at the conventional low reproducing speed. Because the spacing between pulses manifests the information, large variations in speed are readily tolerated without loss of intelligence. As the magnetic tape is moved past the electromagnetic transducer sensing the retrospective pulse modulation on the tape, conventional speed changing circuitry and apparatus are enabled in conventional manner to lower the speed of transport of the tape from the high searching speed to the relatively low reproducing speed, and stop the tape entirely if that is desired, without changing the address reading circuitry in any way.

Still further according to the invention, the principle of retrospective pulse modulation is highly advantageous in optoelectronically translating printed data into digital signals for electronic computing and data processing systems. Fundamentally, the data is printed in the form of a series of lines parallel to each other and spaced apart in a manner equivalent to the pulse train signals described above. A simple optical sensing arrangement, for example, a light source and photo diode arrangement, is passed from a starting line or bar generally normally of the series of lines with a smooth but not necessarily uniform rate. Variations in the spacing of the bars, in the speed of scanning, and in the direction or angle of crossing of the bars by the optoelectronic scan will not seriously affect the data. No synchronizing or clocking apparatus is needed so that hand-held optical scanners are practical and inexpensive. Buffering at the electronic computer or data processor is simple.

In order that full advantage of the invention may be obtained in practice, preferred embodiments thereof, given by way of examples only, are described in detail hereinafter with reference to the accompanying drawing, forming a part of the specification, and in which.

Figure 2:
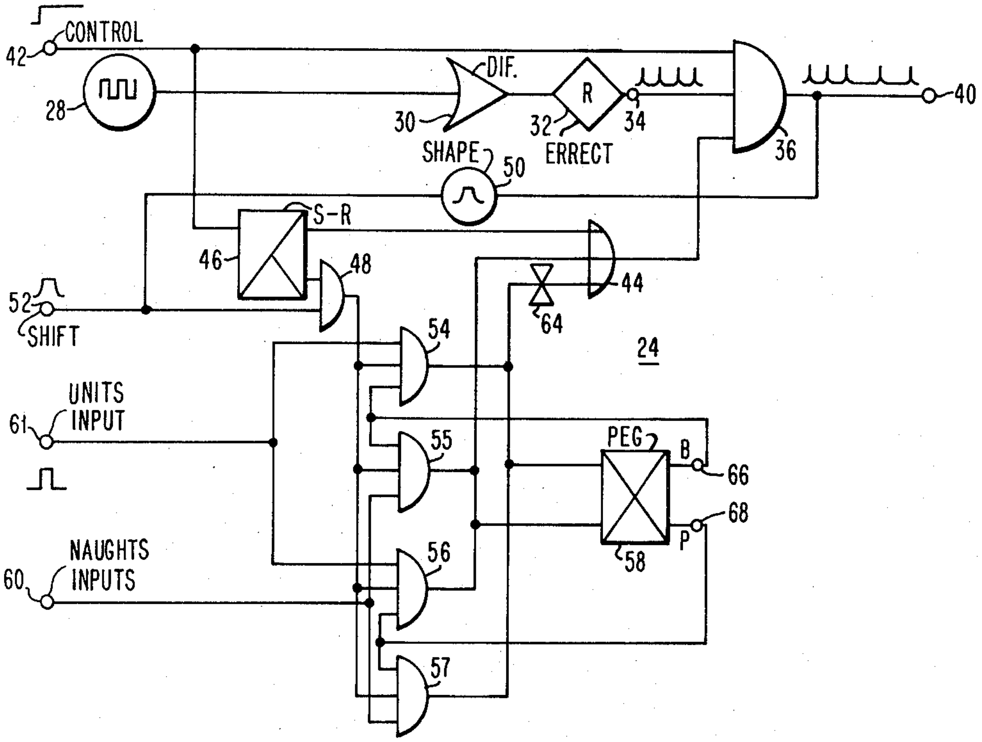
FIG. 2 is a functional diagram of a basic retrospective pulse modulator.
Figure 3:
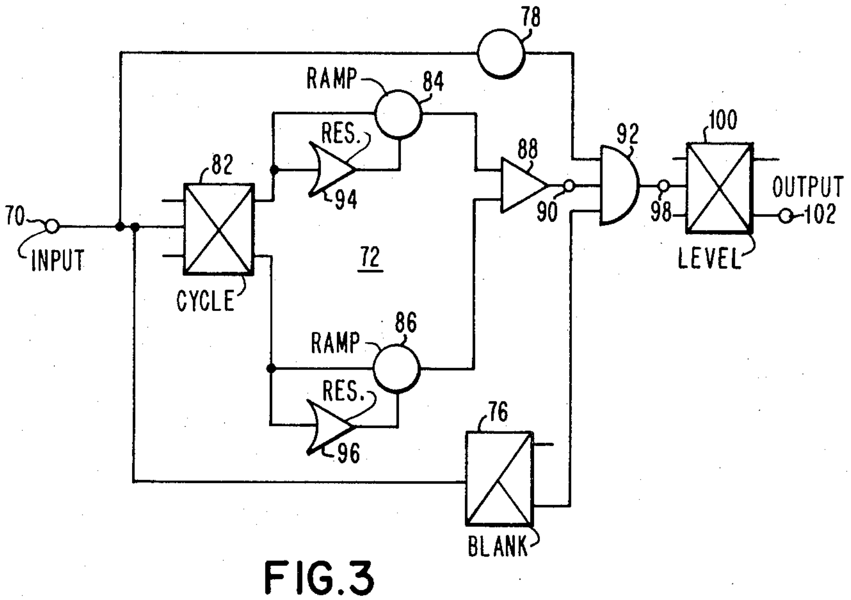
FIG. 3 is a basic retrospective pulse demodulator according to the invention.
Figures 4, 5, 6, 7:
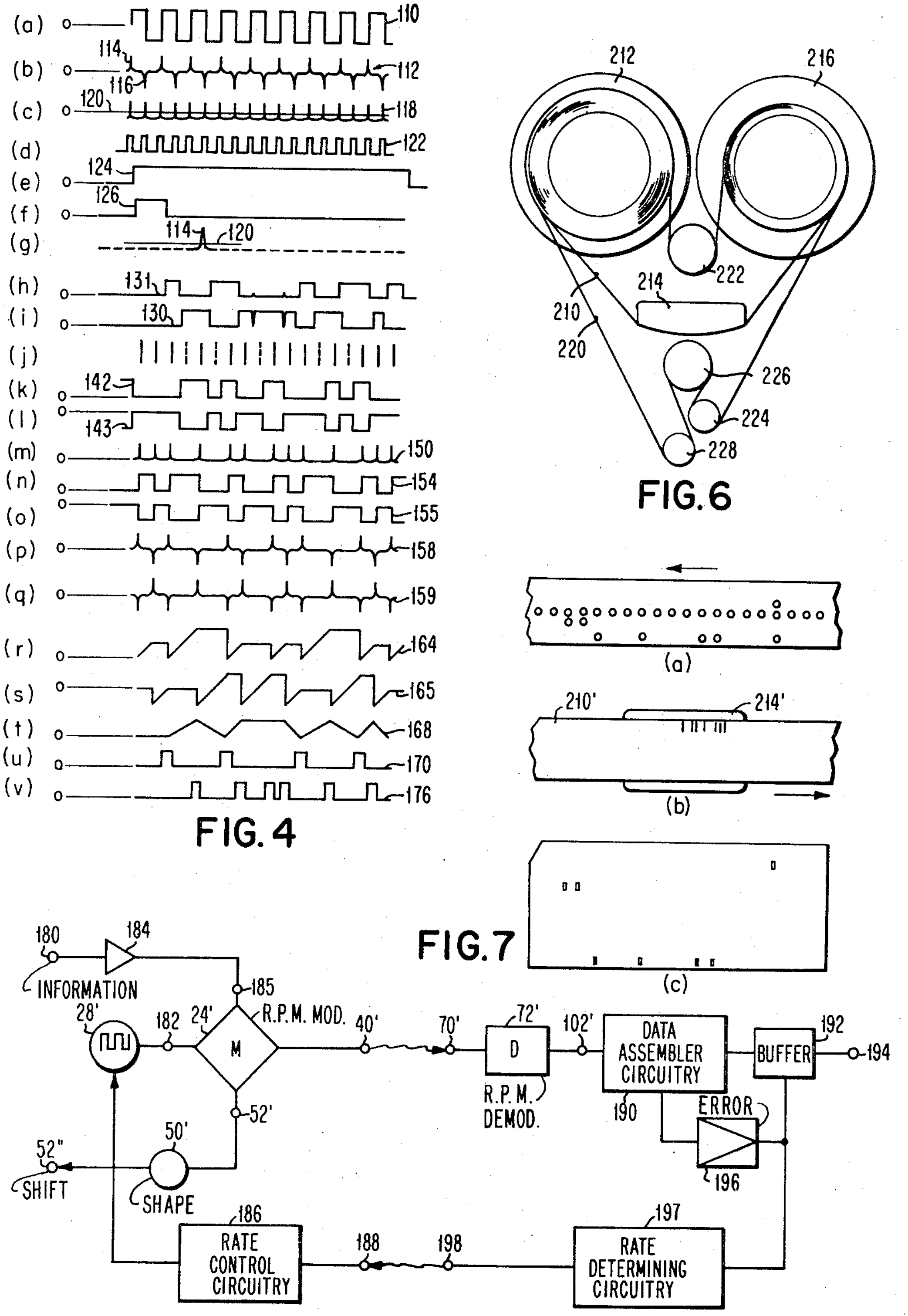

FIGS. 4*a*, 4*b*, 4*c*, 4*d*, 4*e*, 4*f*, 4*g*, 4*h*, 4*i*, 4*j*, 4*k*, 4*l*, 4*m*, 4*n*, 4*o*, 4*p*, 4*q*, 4*r*, 4*s*, 4*t*, 4*u*, and 4*v* are graphical representations of waveforms useful in understanding the functioning of the apparatus illustrated in FIGS. 2 and 3;

FIG. 5 is a functional diagram of an adaptive rate transmission communication system according to the invention;

FIG. 6 is an illustration of a conventional magnetic tape record media apparatus operable with retrospective pulse modulation according to the invention; and FIG. 7*a*, 7*b* and 7*c* depict alternate manifestations of the retrospective pulse modulation and a simple means for addressing magnetic tape based on the invention.

Figure 1:
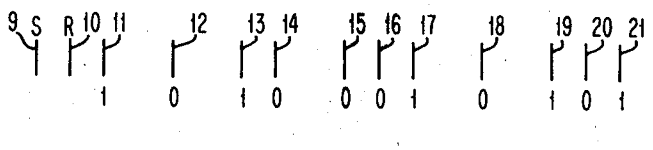
FIG. 1 is a graphical representation of binary information laid down in retrospective pulse modulation to form according to the invention.

The underlying principle of retrospective pulse modulation is illustrated in FIG. 1. Information in the form of an eleven order binary number, 10100010101 is coded in this general example. A series of parallel lines 9–21 can be considered as narrow electric pulses established at time intervals proportional to the spacing between the lines 9–21, or as printed lines or bars for optically manifesting the information desired, or as indications of raised or depressed surfaces manifesting the information for mechanical sensing, or as representations of lines of magnetic dipoles or transitions between domains of uniform polarity, or as other manifestations by physical form as will occur to those skilled in the art. A start line or bar 9 is followed at a predetermined spacing by a reference bar 10 for initiating the retrospective modulation. The first information manifesting bar 11 follows the reference 10 by a spacing substantially equal to the spacing between the start bar 9 and the reference bar 10 to manifest a binary unit; obviously a binary naught might be better manifested by this arrangement depending upon the situation facing the designer. The following bar 12 is arranged on the former basis to denote a binary naught by spacing a bar 12 substantially twice the distance from the preceding bar 11 as that bar follows the reference bar 10. In a sense the information is carried by the spacing between bars. The binary unit is set down at a time at which the spacing between the two preceding bars 9 and 10 is equal to the spacing between the bars 11 and 10. Unequal spacing of the bar 12 from the preceding bar 11 as compared to the spacing between the reference bar 10 and the bar 11 keynotes a naught. A binary unit (1) is next denoted by setting down a bar 13 at twice the spacing from the preceding bar 12 as was arranged between the start bar 9 and the reference bar 10. A bar 14 following the preceding bar 13 at a spacing smaller than the spacing between the preceding pulses 12 and 13 and equal to the spacing between the start bar 9 and the reference bar 10 will denote a binary naught (0) likewise a bar 15 following the preceding bar 14 by a spacing greater than that between the preceding bars 13 and 14 still denotes binary zero as will bar 16 following the bar 15 by a shorter spacing. A binary naught is denoted by a bar 18 following the preceding bar 17 by a spacing greater than the latter bar follows the earlier bar 16. A succeeding bar 19 denotes a binary unit (1) by following the preceding bar 18 by the same larger spacing as bar 18 followed the bar 17. Bars 20 and 21 denote a naught and a unit by following the bar 19 at uniform spacing. Thus, FIG. 1 gives an example of each of the possibilities of data manifestation in basic binary digit retrospective pulse modulation where the immediate preceding spacing is reflected in the spacing of the digit under consideration. It is within the contemplation of the invention that a different preceding manifestation may be used if desired. For instance, the manifestation of a binary digit might retrospectively look at not the immediately preceding pulse interval but the penultimate one, or the one before that, and so on. Indeed it is contemplated that the pulse interval to be used as a reference will be varied in a given message for a cryptograph communication system of extreme simplicity but of a high degree of security. Obviously, this approach will involve circuit delay and the like although many of the advantages of the invention will be available. Such variations in the retrospective pulse modulation system proposed will be found useful where certain delay is unavoidable or possibly advantageous in the operation of other elements of the system rather than the Modem apparatus. A collating sorter for information bearing matrix (IBM) cards is an example of such a machine for use in a system wherein delay must be accommodated but at the same time it can be overcome without losing advantages.

A basic modulating circuit arrangement 24 is shown in the functional diagram of FIG. 2. A squarewave generator 28 followed by a differentiating circuit 30 and a full wave rectifying circuit 32 produces a train of pulses at the pulse train output terminal 34 uniformly spaced one by one. These pulses are passed through an AND gating circuit 36, when it is in the enabled state to output terminal 40. The AND gating circuit 36 is armed by the application of a control voltage applied at transmitting or modulating control terminals 42, and enabled by bringing up the other lead to the AND gating circuit 36 through an OR gating circuit 44 and monostable reciproconductive circuit 46. The reciproconductive circuit 46 has a time constant at which the AND gate 36 will be enabled for permitting the first two pulses from the terminals 34 to pass through the AND gating circuit 36 after the transmitting control terminals 42 are raised. Thus, a start and a reference pulse appear in succession at the output terminals 40.

Because of the gross inconsistency with which the terminology relating to the many types of "multivibrators" and similar circuits is used, the less frequently but much more consistently used term "reciproconductive circuit" will be used hereinafter in the interest of clarity. As employed herein, the term "reciproconductive circuit" is construed to include all dual current flow path element (including vacuum tubes, transistors and other current flow controlling devices) regenerative circuit arrangements in which current alternates in one and then the other of those elements in response to applied triggering pulses. The term "free running multivibrator" is sometimes applied to the "astable reciproconductive circuit" which is one in which conduction continuously alternates between the elements after the application of a single triggering pulse (which may be merely a single electric impulse resulting from closing a switch for energizing the circuit). Such a circuit oscillates continuously at a rate dependent on the time constants of various components of the circuit arrangement and/or the applied energizing voltage. The term "monostable reciproconductive circuit" will be used to indicate such a circuit in which a single trigger is applied to a single input terminal to trigger the reciproconductive circuit to the unstable state once and return. This monostable version is sometimes called a "single-shot circuit" in the vernacular principally because of the erosion of the original term "flip-flop " and because it is shorter than the term "self-restoring flip-flop circuit" later used in an attempt to more clearly distinguish from the term "bistable flip-flop circuit" even more lately in vogue. "Bistable reciproconductive circuits" are divided into the "binary reciproconductive circuit" which has a single input terminal to which triggering pulses are applied to alternate the state of conduction each time a pulse is applied. Such a circuit is now frequently referred to as a "binary flip-flop." The "bistable reciproconductive circuit" having two input terminals between which successive triggers must be alternately applied to switch from one stable state to the other will be referred to as a "bilateral reciproconductive circuit." This version is presently familiarly called both a "flip-flop" and a "lockover circuit."

The monostable reciproconductive circuit 46 in its normal state arms a message AND gating circuit 48. The latter AND gating circuit 48 is enabled at output pulse time by a signal shaping circuit 50 arranged to generate a broadened gating pulse which is available at shift pulse output terminals 52. Gating pulses are delivered at the output of the message AND gating circuit 48 to enable four three-way AND circuits 54–57. The outputs of the AND gating circuits 54 and 57 are connected to the set terminal of a last pulse translated pegging reciproconductive circuit 58 and the reset terminal is connected to the outputs of AND gating circuits 55 and 56. AND gating circuits 54 and 55 are armed by the B (or blanking) terminal 66 of the reciproconductive circuit 58 while the AND gating circuits 56 and 57 are armed by the P (or passing) terminal 68. A naughts input terminal 60 is connected to AND gating circuit 55 and 57 for enabling them on the input of a naught signal while similarly a units input terminal 61 is connected to enable AND gating circuits 54 and 56, the input of a unit signal. An inverting circuit 64 couples the outputs of AND gating circuits 54 and 57 to the OR gating circuit 44 while the AND circuit 55 and 56 are coupled directly by the OR gating circuit 44 to the AND gating circuit 36. Pulses from the shift pulse output terminal 52 at output pulse time are delivered to a message input device (not shown) such as a shift register arrangement to gate message naughts and units to the terminals 60 and 61. The presence of a data level on terminal 61 will raise the output lines of either AND gate 54 or AND gating circuit 56, whichever is enabled by the last pulse pegging circuit 58. The pulses at terminals 34 will be blanked or passed in accordance with the status of the terminals 61 and the status of the terminals 66 and 68. Likewise, the status of terminal 60 will determine the blanking or passing of the pulse at the time the terminal 60 is brought up.

A basic demodulator circuit 72 is shown functionally in FIG. 3. Pulses from the output terminals 40 of the modulator are applied to input terminals 70 of a basic demodulating circuit 72. The demodulator 72 comprises a monostable reciproconductive circuit 76 similar to the previously mentioned reciproconductive circuit 46 for blanking the start and reference pulses from the output. An enabling gate pulse generator 78, which may be a signal shaping circuit like that of the shift pulse generator 50, is also coupled to the input terminals 70. The heart of the demodulator 72 comprises a binary reciproconductive circuit 82 having the output terminals individually connected to ramp voltage generators 84 and 86 which are in turn coupled to a comparing circuit 88, shown here as being of the differential amplifier type having an output terminal 90 connected to an AND gating circuit 92 to which the reciproconductive circuit 76 and the gating circuit 78 are connected. The ramp voltage generators 84, 86 are conventional circuits; simple integrating circuits, comprising a resistor and a capacitor for example, and resetable by pulsing a transistor connected across the capacitor to short circuit the latter momentarily, are sufficient. Differentiating circuits 94 and 96 are enabled as the binary reciproconductive circuit 82 switches and reset the ramp generators 84 and 86, respectively. The ramp generator 84, for example, is reset by a spike from the differentiating circuit 94 as the reciproconductive circuit 82 switches on a pulse received at the input terminal 70. The ramp generator 84 continues to rise until the reciproconductive circuit 82 switches on the succeeding pulse which permits the ramp generator 84 to hold its attained voltage level while the other ramp generator 86 functions in the same manner. Thus, one ramp generator 84 measures the spacing between alternate pairs of succeeding pulses and the other ramp generator 86 measures the spacing between the other pairs of them. At each pulse the outputs of the ramp generators 84, 86 are compared in the comparing circuit 88. If the spacings are equal, the attained voltages are substantially equal and substantially zero output appears at the comparator terminal 90. If the spacings are unequal, the ramp voltages will be unequal and an output voltage above zero will appear at the output comparator terminal 90. The levels at the output terminal 90 are converted to pulses by action of the AND gating circuit 92 at the pulse output terminals 98. If output levels are desired, a Schmitt or level distinguishing type reciproconductive circuit 100 is used as shown. The hysteresis characteristic of the Schmitt trigger circuit is of advantage in rejecting all doubtful comparisons.

The retrospective pulse modulation according to the invention is operable with asynchronous and synchronous apparatus. Where the associated apparatus is capable of delivering a train of substantially uniformly or at least similarly timed pulses, as is very often the case, demodulation is readily effected by gating strings of pulses on the occurrence of modulation pulses and measuring the intervals by comparing the number of pulses gated on an equal-not equal basis. Such comparing circuits are frequently a part of central processing equipment with which input/output apparatus according to the invention is useful. An advantage of pulse counting comparison is found in the weighting of acceptable matching to unacceptable. Simple circuitry can be used to reject a match deemed too far from equal for the purpose intended.

The operations of the modulator 24 and the demodulator 72 will be clearly understood with reference to the graphical representation of waveforms shown in FIG. 4. A square wave 110 produced by the square wave generator 28 is shown in FIG. 4(*a*). This wave is applied to the differentiating circuit 30 to produce a wave 112 having positive going spikes 114 and negative going spikes 116 as shown in FIG. 4(*b*). This wave is applied to a full wave rectifier 32 from which a wave 118 having positive going spikes only emanates as shown in FIG. 4(*c*). From this latter wave, a gating wave 122 as shown in FIG. 4(*d*) is obtained by the shaping circuit 50. This latter circuit is functionally contemplated by a clipping circuit for reducing the amplitude followed by a high-gain amplifier circuit and preferably thereafter by a regenerating circuit (such as a bistable reciproconductive circuit) to provide a square wave based on the broader lower portions of the pulse wave 118 below a clipping level line 120. An enlarged example of the development of the square wave pulse from a spike is shown in FIG. 4(*g*) in the timed relationship described. The first four waves are shown in idealized form having precise amplitude and precise interval for clarity and understanding the operation of the circuitry described above, however, it should be noted at this point that it is an advantage of the invention to translate information accurately with less accurate waveforms produced by less expensive and less critical apparatus. The wave 118 is a uniform, continuous pulse wave. At the time it is desired to modulate the uniform continuous wave 118 according to the invention, the terminal 42 is brought up to a level as shown by modulation gating level wave 124 of FIG. 4(*e*). At the time the wave 124 first comes up, the monostable reciproconductive circuit 46 is triggered to produce a change of levels at one output terminal represented by the wave 126 in FIG. 4(*f*). Information represented by pulses 11–21 are applied in time sequence to the input terminals 61 and 60 in conventional manner. Readily adaptable conventional apparatus for this purpose comprises an entirely conventional shift register having output lines coupled to the terminal 60 and 61 and a shift line coupled to the terminal 52 for translating levels 130 and 131 as represented in FIG. 4(*h*) and (*i*). FIG. 4(*j*) illustrates the modulation of the uniform continuous pulse wave for conveying the information represented by the information pulses 11–21 in the time relationship according to the invention. The curves 142 and 143 shown in FIG. 4(*k*) and (*l*) are the waves that appear at the terminal 66 and 68 of the last pulse pegging reciproconductive circuit 58 for operating the gating circuits 54–57 as described. The resulting output wave at the output terminal 40 is represented by the wave 150 shown in FIG. 4(*m*) which wave is translated by conventional means to the input terminal 70 of the demodulator 72.

From the input terminal 70, wave 150 is applied to the input switch and reciproconductive circuit 82 from the output terminals of which complementary pulse waves 154 and 155 are obtained as shown in FIG. 4(*n*) and (*o*). These waves are differentiated by circuits 94 and 96 to produce resetting pulse waves 158 and 159, respectively, as shown in FIG. 4(*p*) and (*q*). In accordance with this switching and resetting, the ramp generators 84 and 86 produce output waves 164 and 165 as shown in FIG. 4(*r*) and (*s*). These waves are applied to the differential amplifier-type comparing circuit 88 whose output terminal 90 produces a wave illustrated in FIG. 4(*t*) by the line 168, the upper and lower extremities of which represent the values corresponding to unequal and equal values, respectively, of the ramp generator wave 164 and 165. Waves 170 and 176 represented in FIG. 4(*u*) and (*v*) are the output waves at terminals 98 and 102, respectively.

From these waves, the fundamental advantages of the modulation according to the invention become evident. Perhaps the most obvious conclusion from a glance at the waveform is that the ramp generators 84 and 86 need not be at all linear but merely follow the same mathematical expression with respect to time. Actually the tolerances of circuitry used in apparatus according to the invention is such that mass production circuitry is entirely adequate for nearly all applications of the invention. If the frequency of the generator 28 tended to drift, the wave 110 would drift timewise accordingly and the subsequent waves shown would drift in corresponding fashion. This way the ramp waves would still compare in corresponding fashion to a high degree from pulse to pulse as shown in the foregoing example where only the spacing distance between the preceding two pulses is compared with the spacing between the two pulses under consideration. In some instances, utilization circuitry and other circuitry of apparatus to which the invention is applied may call for retrospective comparison of not the immediately preceding spacing but one several spacings earlier. Suitable holding and delaying circuitry of conventional form is applicable to such an arrangement. Less drift can be tolerated, obviously, but the overall objects of the invention are still obtained in such a form of retrospective pulse modulation. Deliberate and wide changes in frequency are contemplated in many applications of retrospective pulse modulation according to the invention.

An example of one such application is shown in FIG. 5 depicting the essentials of an adaptive rate communications system employing retrospective pulse modulation according to the invention. A modulator 24' which may be essentially the same as that shown in FIG. 2 is supplied at carrier train input terminals 182 with a square wave oscillation from a generator 28'. The modulating information is applied at modulation information input terminals 180 by way of translating circuitry 184, which may be amplifying circuit, signal shaping circuits, a clipping circuitry or other circuitry as necessary for readying the information for blanking or passing pulses at the modulating control input terminals 185. The generator 28' need differ only from that previously described in that the pulse repetition rate can be varied by means of rate control circuitry 186 to which a controlled level is applied at control level input terminals 188. Such generator and control circuitry are known for varying the rate of a square wave oscillator. The output terminal 40' delivers the retrospective pulse modulated wave to suitable transmitting terminal equipment for carrier communications, electrical or optical wave transmissions, wire transmission, radio transmission and the like to complementary receiving terminal facilities connected to input terminal 75 of demodulating circuit 72' which may be that shown in FIG. 3 hereinbefore. The demodulated signal is available at output terminals 102' for application to data assembler circuitry 190 wherein the data is assembled and translated to circuitry using conventional form of data for handling in a handling circuit 192 and delivery to data output terminals 194. An error detecting circuit 196 is connected to the data assembler circuitry 190 and to the handling circuitry 192 for preventing data recognized as erroneous from occurring at the output terminals 194. Such circuitry is well known and need not be described further. The output of the error detecting circuitry 196 is brought to terminals 198 for application to transmitting terminal facilities to convey a rate control signal to receiving terminal facilities to which the control level input terminals 188 are attached.

Referring to FIG. 6, a known configuration of strip record medium transport is shown schematically. This configuration is described in U. S. Pat. application Ser. No. 766,424 of Dale Darwin Decker et al which matured as U. S. Pat. No. 3,514,049 on the 26th day of May 1970 for Strip Record Medium Contact Belt Driven Transport. This arrangement is frequently used with magnetic tape as the strip record medium and operated in a searching mode at speeds up to fifty times that used in the reproducing mode. The embodiment of the invention will be so described with the clear understanding that other strip record media may similarly be transported according to the invention by those skilled in the art. A length of magnetic tape 210 wound on a supply reel 212 is guided past an electromagnetic transducer 214 and wound on a takeup reel 216. The tape 210 is transported by means of a driving belt 220 passing over the tape on the supply reel 212, a drive capstan 222, the tape on the takeup reel 216, a roller 224, another roller 226, and a further roller 228. The drive capstan 222 is most frequently arranged as shown to insure a large area of contact between the driving belt 220 and the tape 210 on the reels 212 and 216. At the same time, one or both rollers 224 and 228 are arranged in known fashion to maintain substantially constant tension in the belt 220. The roller 226 is frequently an idler roller but in some arrangements, the roller 226 is also constituted as an additional drive capstan, with the rollers 224 and 228 arranged to insure a large area of contact of the tape 220 with the auxiliary drive capstan 226. In the latter case the peripheral speeds of the drive capstans 222 and 226 differ by a small percentage (the capstan 222 being the faster) so that constant tension is maintained in the tape 210 as it passes over the electromagnetic transducer 214; the tension also serving to hold the tape 210 firmly in place at all speeds.

A fundamental method of preparing magnetic tape with retrospective pulse modulated addresses according to the invention utilizes a punched paper tape as shown in FIG. 7. A simple manual control punch may be used to set up a multiple of addresses in a punched paper tape, as for example, that shown in FIG. 7(*a*). Where the tape punching facilities are arranged for punching a plurality of holes transversely in the tape, as is almost invariably the case, start and reference punches and end of address block punches preferably will be placed in rows different from the address number punches as shown. This facilitates circuit arrangements for controlling the movement of the paper tape, as well as visual observation, and the recording of corresponding information magnetically on the magnetic tape. Thus, manifestations of the retrospective pulse modulation appearing as apertures in a card record medium are translated into magnetic marks on length of magnetic tape, as shown schematically in FIG. 7(*b*). Master address paper tapes can easily be prepared and used in any number of magnetic tape recording situations. Also, Information Bearing Matrix (IBM) cards may be prepared in the manner of short lengths of paper tape where the accommodations for such are available and in the absence of paper tape punching apparatus. The IBM cards in addition offer much more flexibility than does paper tape and are only slightly more complex in preparation.

It is a decided advantage that a positive pulse or other manifestation is had at every signal transition of the retrospective pulse code modulation apparatus according to the invention. Simple shift register arrangements are sufficient to store the data sequentially appearing in modulation or on demodulation. Clocking pulses and like manifestation of the associated apparatus are used to shift the registers at RPM transition time on call of the interfaced apparatus. Parallel input from and output to the associated apparatus to and from the shift register is simple, inexpensive and rapid; only the buffering necessary in the opposite exchange is necessary and the circuitry for this though less rapid is likewise simple and inexpensive. Interfacing with both synchronous and asynchronous systems is equally simple.

While the invention has been shown and described particularly with reference to preferred embodiments thereof, and various alternative structures have been suggested, it should be clearly understood that those skilled in the art may effect further changes without departing from the spirit and scope of the invention as defined hereinafter.

The invention claimed is:

1. Retrospective pulse demodulating apparatus comprising;

means for inputting a pulse modulated signal, means coupled to said inputting means for measuring an interval between two successive pulses of said signal, means coupled to said inputting means for measuring another interval between two successive pulses of said signal, means coupled to both said measuring means for comparing the measurements of the intervals, and means coupled to said comparing means for outputting data of one nature in response to equal measurements and data of another nature in response to unequal measurements.

2. Retrospective pulse demodulating apparatus as defined in claim 1 and wherein said measuring means comprises at least one integrating circuit.

3. Retrospective pulse demodulating apparatus as defined in claim 1 and incorporating means coupled to both said measuring means for resetting each of the latter to an initial condition at the start of each measurement.

4. Retrospective pulse demodulating apparatus as defined in claim 3 and wherein said resetting means comprises at least one differentiating circuit.

5. Retrospective pulse demodulating apparatus as defined in claim 1 and wherein said comparing means comprises a differential amplifying circuit arrangement.

6. Retrospective pulse demodulating apparatus comprising means for inputting a pulse modulated signal, means coupled to said inputting means for measuring an interval between two successive pulses of said signal, means coupled to said inputting means for measuring another interval between two successive pulses of said signal, a differential amplifying circuit arrangement having input terminals individually coupled to said measuring means and an output terminal, an AND gating circuit having an input terminal connected to said output terminal of said differential amplifying circuit arrangement, another input terminal coupled to said inputting means, and an output terminal for delivering an output level at pulse time.

7. Retrospective pulse demodulating apparatus as defined in claim 6 and incorporating a monostable reciproconductive circuit coupled between said inputting means of the demodulating apparatus and another input of said AND gating circuit for removing an initial pulse from the output of the demodulating apparatus.

8. Retrospective pulse demodulating apparatus comprising means for inputting a pulse modulated signal, means coupled to said inputting means for measuring the spacing between successive pairs of manifestations all spaced apart in time by multiples of a nominal minimum spacing, means coupled to said measuring means for comparing the measurement between one of said successive pairs of manifestations with the measurement between another of said successive pairs of manifestations, and means coupled to said comparing means for interpreting the outputs of the comparing means as information of one nature or another.

9. Retrospective pulse demodulating apparatus comprising means for inputting a pulse modulated signal, a binary reciproconductive circuit having an input terminal coupled to said inputting means and binary output terminals, a pair of integrating circuits individually coupled to the binary output terminals of said reciproconductive circuit, a differential amplifying circuit having balanced input terminals connected individually to said integrating circuits, and a level distinguishing reciproconductive circuit coupled to the output of said differential amplifying circuit.

10. Apparatus for decoding binary information carried by a series of discrete pulses or transitions in which each binary digit is represented by two associated pairs of pulses or transitions, the binary values being distinguishable by a comparison of the intervals between each pair of two such associated pairs of pulses or transitions, said apparatus comprising indicating means having input terminals to which said series of pulses is applied and effective for providing an indication of the duration of the interval between one pair of two such pairs of associated pulses or transitions, further indicating means having input terminals to which said series of pulses is applied and effective for providing an indication of the duration of the interval between the associated pair of pulses or transitions, and means coupled to both said indicating means for comparing the individual indications therefrom for identifying the value of the binary digit represented by two such associated pairs of pulses.

11. Apparatus as defined in claim 10 and in which said comparing means is effective for comparing the individual indications from said indicating means for equality, one of said binary values being represented by equality of interval duration and the other in inequality.

12. Apparatus as defined in claim 11 and in which each intermediate pulse or transition of said train of pulses or transitions represents, in combination with its immediately preceding and succeeding pulses or transitions, one binary digit pair being constituted by the preceding pulse or transition and the intermediate pulse or transition, and the associated pair being constituted by the intermediate pulse or transition and the succeeding pulse or transition, said apparatus further including control means, responsive to each successive pulse or transition, for effecting alternate operation of said indicating means.

13. A method of decoding RPM bar coding comprising the steps of measuring the intervals between successive pairs of manifestations, comparing the intervals one with another, outputting data of one nature from consecutive intervals of equal extent, and outputting data of another nature from consecutive intervals of unequal extent.

14. Apparatus for demodulating retrospective pulse coding comprising means for detecting the presence of a multiple of successive manifestations spaced apart by one of two given intervals, means coupled to said detecting means for comparing the successive spacings between said manifestations, and means coupled to said comparing means for evaluating the spacing between a preceeding pair of manifestations and the spacing between subsequent manifestations as one character of information for equal spacing and as another character of information for unequal spacing.

* * * * *

Disclaimer 3,805,175.—*Ernie George Nassimbene*, San Jose, Calif. RETROSPECTIVE PULSE MODULATION DECODING METHOD AND APPARATUS. Patent dated Apr. 16, 1974. Disclaimer filed Jan. 17, 1975, by the assignee, *International Business Machines Corporation.*

Hereby enters this disclaimer to claims 1, 2, 3 and 8 of said patent.

[*Official Gazette May 20, 1975.*]